United States Patent
Inoue et al.

(10) Patent No.: US 7,203,150 B2
(45) Date of Patent: Apr. 10, 2007

(54) OPTICAL RECORDING MEDIUM AND ITS RECORDING SYSTEM

(75) Inventors: Hiroyasu Inoue, Chuo-ku (JP); Hideki Hirata, Chuo-ku (JP)

(73) Assignee: TDK Corporation, Tokyo (JP)

( * ) Notice: Subject to any disclaimer, the term of this patent is extended or adjusted under 35 U.S.C. 154(b) by 320 days.

(21) Appl. No.: 10/485,664

(22) PCT Filed: Sep. 24, 2002

(86) PCT No.: PCT/JP02/09797

§ 371 (c)(1),
(2), (4) Date: Feb. 3, 2004

(87) PCT Pub. No.: WO03/028021

PCT Pub. Date: Apr. 3, 2003

(65) Prior Publication Data

US 2004/0190418 A1 Sep. 30, 2004

(30) Foreign Application Priority Data

Sep. 26, 2001 (JP) .............................. 2001-292798
Sep. 26, 2001 (JP) .............................. 2001-294165

(51) Int. Cl.
*G11B 5/09* (2006.01)
(52) U.S. Cl. ................................ 369/59.11; 369/275.2
(58) Field of Classification Search ............ 369/59.11, 369/275.4
See application file for complete search history.

(56) References Cited

U.S. PATENT DOCUMENTS

| 5,648,134 A * | 7/1997 | Shiratori et al. ........... 428/64.1 |
| 6,177,167 B1 * | 1/2001 | Yuzurihara et al. ........ 428/64.1 |
| 6,888,781 B2 * | 5/2005 | Nishino et al. ........... 369/13.04 |
| 2002/0021643 A1* | 2/2002 | Miura et al. ............. 369/59.11 |

FOREIGN PATENT DOCUMENTS

JP       A 54-126005        9/1979

(Continued)

OTHER PUBLICATIONS

Kubogata et al., "Phase change optical disks with low cross-erase," Proceedings of 11$^{th}$ Symposium on Phase Change Optical information storage, pp. 78-82, Nov. 25-26, 1999.

*Primary Examiner*—Thang V. Tran
*Assistant Examiner*—Van T. Pham
(74) *Attorney, Agent, or Firm*—Oliff & Berridge, PLC

(57) ABSTRACT

An optical recording medium and a recording system for the same are provided, which can dissipate heat produced by a laser beam during recording operations to thereby increase the erasing power margin of the laser beam which allows the playback jitter value to take on a certain value or less.

A recording system 1 includes an optical recording medium 10 and an optical recording apparatus 30. The optical recording medium 10 has a reflective film 16, a second dielectric layer 18, a recording layer 20, a heat sink layer 24, and a light-transmitting layer 26, which are formed on a support substrate 12. The heat sink layer 24 is made of a material having a certain range of thermal conductivity, e.g., alumina. The optical recording apparatus 30 allows a laser beam of 450 nm or less in wavelength to be incident from the light-transmitting layer 26 via a lens system having an objective lens with a numerical aperture of 0.7 or more. The optical recording medium 10 dissipates heat produced by the laser beam through the heat sink layer 24 to thereby prevent an increase in temperature of the recording layer 20, such that the relation between the recording power Pw of the laser beam and the erasing power Pe satisfies $0.7 \leq Pe/Pw \leq 1.0$.

10 Claims, 9 Drawing Sheets

FOREIGN PATENT DOCUMENTS

| | | |
|---|---|---|
| JP | A 60-264293 | 12/1985 |
| JP | A 63-117325 | 5/1988 |
| JP | A 11-328732 | 11/1999 |

\* cited by examiner

OPTICAL RECORDING MEDIUM AND ITS RECORDING SYSTEM

TECHNICAL FIELD

The present invention relates to an optical recording medium, and more particularly to an optical recording medium which has a wide power margin and to a recording system for the same.

BACKGROUND ART

Conventional optical recording media (discs) such as CDs (Compact Discs) and DVDs (Digital Versatile Discs) are fabricated such that their various characteristics (electrical and mechanical properties) comply with predetermined specifications in their as-fabricated (initial) conditions, and as a basic property, their playback jitter values are particularly required to be equal to or less than a certain value.

One of the factors responsible for variations in the playback jitter value is the ratio between the recording power Pw of a laser beam employed during recording operations and the erasing power Pe of a laser beam applied to erase data before the radiation with the laser beam for the recording operations.

In general, an increase in the ratio Pe/Pw, i.e., an increase in Pe would cause self-erasing to occur during a recording operation due to heat generated by a laser beam employed during an erasing operation, thereby leading to degradation in playback jitter value.

Therefore, such a recording strategy has to be employed which makes the erasing power Pe of a laser beam as low as possible to prevent degradation in playback jitter value even when the erasing power Pe is increased due to manufacturing variations of the semiconductor laser or variations of the control system.

Explaining this in more detail, the aforementioned recording scheme employed to read data allows an optical recording medium to be radiated with a reproducing laser beam along the tracks to detect the reflected light, thereby reading information carried by recording marks. On the other hand, to record data, the optical recording medium is radiated with a recording laser beam along the tracks, thereby forming recording marks having a predetermined length. For example, a DVD-RW or a type of the user data-rewritable optical recording medium employs recording marks having lengths corresponding to 3 T to 11 T and 14 T (where T is one clock cycle), thereby recording data.

In general, when data is recorded on an optical recording medium, the optical recording medium is not radiated with a recording laser beam that has the same pulse width as the duration corresponding to the length of a recording mark to be formed but with a recording laser beam of a train of the number of pulses determined in accordance with the type of the recording mark to be formed, thereby forming recording marks having a predetermined length. For example, to record data on the aforementioned DVD-RW, pulses as many as n−1 or n−2 (where n indicates the type of recording marks and takes on any one value of 3 to 11 and 14) are successively impinged thereon, thereby forming any one of the recording marks having lengths corresponding to 3 T to 11 T and 14 T. Accordingly, for n−2, to form a recording mark having a length corresponding to 3 T, one pulse is used, while to form a recording mark having a length corresponding to 11 T, nine pulses are used. On the other hand, for n−1, to form a recording mark having a length corresponding to 3 T, two pulses are used, while to form a recording mark having a length corresponding to 11 T, ten pulses are used.

In general, to overwrite an optical recording medium, on which data has been once recorded, with data different therefrom, the train of recording marks corresponding to the currently recorded data is directly overwritten with a train of recording marks corresponding to the overwrite data.

However, in the case where the data that has been stored on an optical recording medium for a long time is directly overwritten with new data, the old recorded data may be insufficiently erased in some cases. In particular, when an optical recording medium has been exposed to a hot and humid environment after data had been recorded thereon, the old recorded data is less prone to being erased. Accordingly, the direct overwriting of the data that has been stored on an optical recording medium for a long time with new data would cause degradation in the jitter of the new overwrite data, thereby causing a problem of being unable to reproduce the data with accuracy in some cases. Such a problem becomes noticeable in recording operations performed at a high setting of data transfer rate (e.g., 35 Mbps or more).

To thoroughly erase such old data, the erasing power can be effectively increased. However, to form recording marks having a good shape, it is necessary to appropriately set the ratio (Pe/Pw) of the erasing power to the recording power of a recording laser beam for each target optical recording medium. If the ratio of the erasing power to the recording power is out of an appropriate range, recording marks cannot be formed in a proper shape, thus causing significant degradation in jitter. The proper range in which the ratio of the erasing power to the recording power falls is generally referred to as a "power margin," which is desired to be wider for recording operations with better stability. Accordingly, to thoroughly erase old data, such an optical recording medium is demanded which can provide better jitter even at a higher ratio of the erasing power to the recording power.

On the other hand, in recent years, there has been a great demand for an optical recording medium operable at further improved data transfer rates. However, since the laser for recording operations needs to be driven at increased speeds to increase the data transfer rate, a lower ratio (Pe/Pw) of the erasing power to the recording power would cause improper pulse tracking. For this reason, there is a need for an optical recording medium which can provide good jitter even when a higher ratio (Pe/Pw) of the erasing power to the recording power needs to be set for recording operations at higher data transfer rates.

However, the aforementioned recording strategy requires a complicated control of the semiconductor laser. In particular, in high-speed recording operations, there is a problem that when recording pulses for driving the semiconductor laser are significantly reduced in pulse width, the actual waveform of the laser beam could not properly follow the recording pulses at a reduced Pe/Pw.

There is also a problem that the recording strategy employed for DVD-RWs or the like operates at power levels of three values, i.e., the recording power, the erasing power, and the bottom power, which make the recording strategy complicated.

The present invention was developed in view of the aforementioned conventional problems. It is therefore an object of the-invention to provide a recording system for an optical recording medium which can prevent self-erasing to provide improved playback jitter values and which can employ a recording strategy at power levels of substantially two values.

It is another object of the present invention to provide an optical recording medium having an increased power margin.

It is still another object of the present invention to provide an optical recording medium which can provide good jitter even when recording marks are formed with a recording laser beam at a high ratio of the erasing power to the recording power.

DISCLOSURE OF THE INVENTION

That is, the following inventions achieve the aforementioned objects.

The objects of the present invention are also achieved by (1) an optical recording medium which has at least a recording layer and records information in the form of recording marks being created in the recording layer with a recording laser beam. The optical recording medium is characterized in that jitter of recording marks is 13% or less, the recording marks being formed at a Pe/Pw setting of 1.0, where Pw is a recording power of the recording laser beam and Pe is an erasing power.

According to the present invention, because of a wide margin of the ratio of the erasing power to the recording power, data recording can be performed with stability with reduced jitter in direct overwriting of old data with new data even when the ratio of the erasing power to the recording power is increased to thoroughly erase the old data.

(2) An optical recording medium characterized in that the jitter of recording marks is 11% or less, the recording marks being formed at a Pe/Pw setting of 1.0.

According to the invention set forth in (2), because of a wider margin of the ratio of the erasing power to the recording power, data recording can be performed with better stability with further reduced jitter even at an increased ratio of the erasing power to the recording power.

(3) An optical recording medium characterized in that the jitter of recording marks is 10% or less, the recording marks being formed at a Pe/Pw setting of 0.7.

According to the invention set forth in (3), because of a much wider margin of the ratio of the erasing power to the recording power, data recording can be performed with much better stability with much more reduced jitter even at an increased ratio of the erasing power to the recording power.

(4) An optical recording medium characterized in that the jitter of recording marks is 9% or less, the recording marks being formed at a Pe/Pw setting of 0.7.

According to the invention set forth in (4), because of an extremely wider margin of the ratio of the erasing power to the recording power, data recording can be performed with far better stability with significantly reduced jitter even at an increased ratio of the erasing power to the recording power.

(5) An optical recording medium further including a light-transmitting layer provided on the side of incidence of the recording laser beam, and a dielectric layer and a heat ink layer provided between the recording layer and the light-transmitting layer.

(6) An optical recording medium characterized in that the heat sink layer has a thickness of 10 to 200 nm.

According to the invention set forth in (6), it is possible to obtain a wide power margin with stability without excessively reducing the throughput of manufacturing processes.

(7) An optical recording medium characterized in that the heat sink layer has a thickness of 30 to 100 nm.

According to the invention set forth in (7), it is possible to obtain a wide power margin with better stability without excessively reducing the throughput of manufacturing processes.

(8) A recording system for an optical recording medium, the system including an optical recording medium provided with at least a light-transmitting layer covered with a recording layer formed on a support substrate, and a radiation optical system for recording, reproducing, and erasing information on/from the recording layer by radiating the optical recording medium from the light-transmitting layer side with a laser beam at a recording power Pw and an erasing power Pe. The radiation optical system is designed to radiate the recording layer with a laser beam of wavelength 450 nm or less through a lens system having an objective lens of numerical aperture 0.7 or more. The optical recording medium is designed to be able to record or erase information on the recording layer when the relation between the recording power Pw of the laser beam and the erasing power Pe satisfies $0.7 \leq Pe/Pw \leq 1.0$.

(9) The recording system for an optical recording medium according to (8), wherein the radiation optical system is designed to radiate the recording layer to record information thereon with a laser beam of wavelength 450 nm or less through a lens system having an objective lens of numerical aperture 0.7 or more, and the optical recording medium is designed to provide a playback jitter value of 10% or less for the information recorded.

As used herein, the term "jitter" refers to the clock jitter having a value that is determined as in $\sigma/Tw$ (%), where a is the signal fluctuation obtained by measuring a playback signal with a time interval analyzer and Tw is the detection window width.

(10) The recording system for an optical recording medium according to (8) or (9), wherein the radiation optical system is designed such that the laser beam has a wavelength of 380 nm or more.

(11) The recording system for an optical recording medium according to (8) or (9), wherein the radiation optical system is designed such that the laser beam has a wavelength of 405 nm, and the lens system is designed to have an objective lens of numerical aperture 0.85.

(12) The recording system for an optical recording medium according to any of (8) to (11), wherein the recording layer is provided, on its light-transmitting layer side, with a heat sink layer.

(13) The recording system for an optical recording medium according to (12), wherein the heat sink layer has a thickness of 10 nm or more and 200 nm or less, preferably, has a thickness of 30 nm or more and 100 nm or less.

BEST MODE FOR CARRYING OUT THE INVENTION

Now, the present invention will be explained below in more detail with reference to the drawings in accordance with the embodiment.

Figure 1:
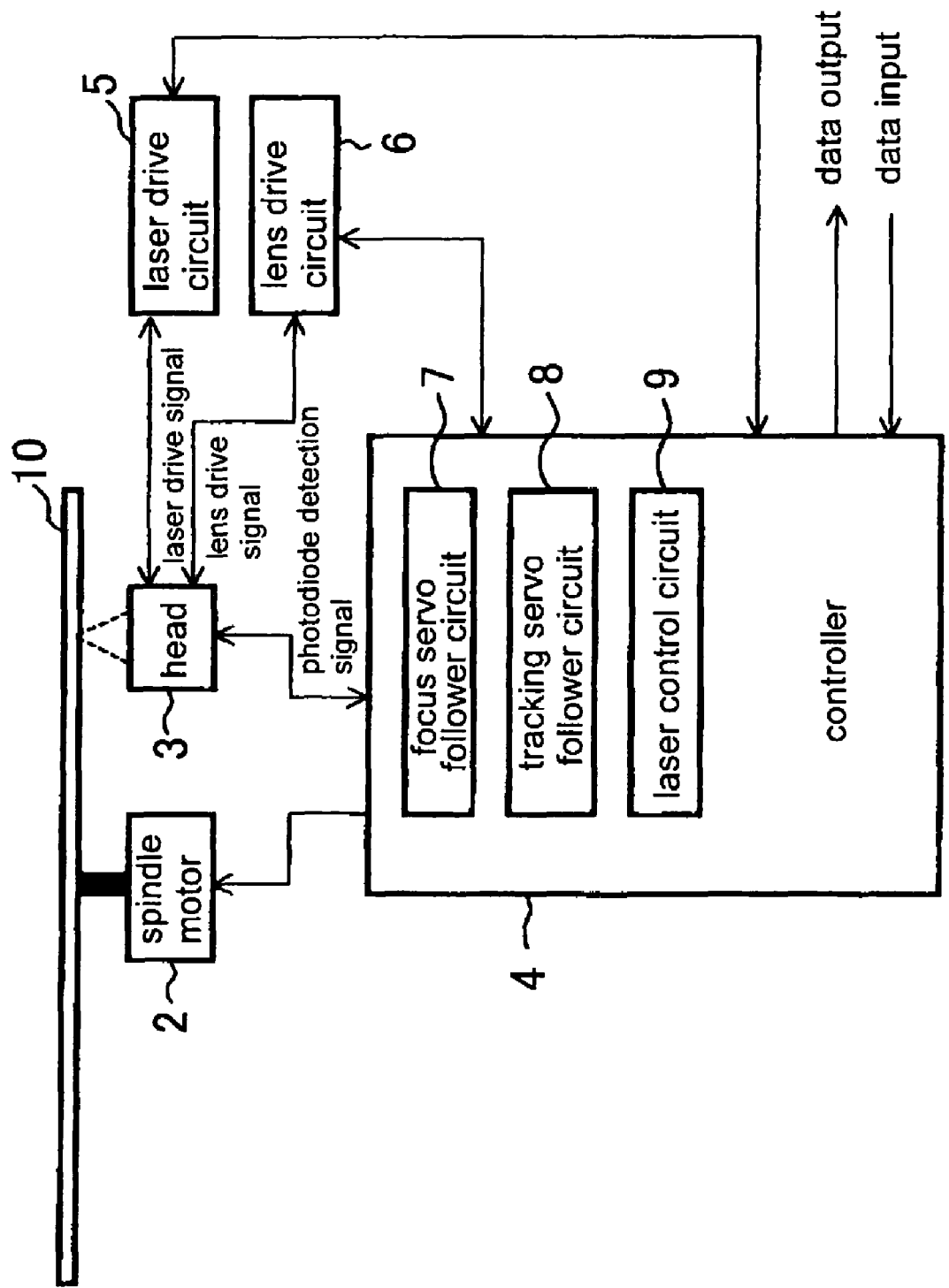
FIG. 1 is a block diagram illustrating a recording system according to an embodiment of the present invention.
Figure 2:
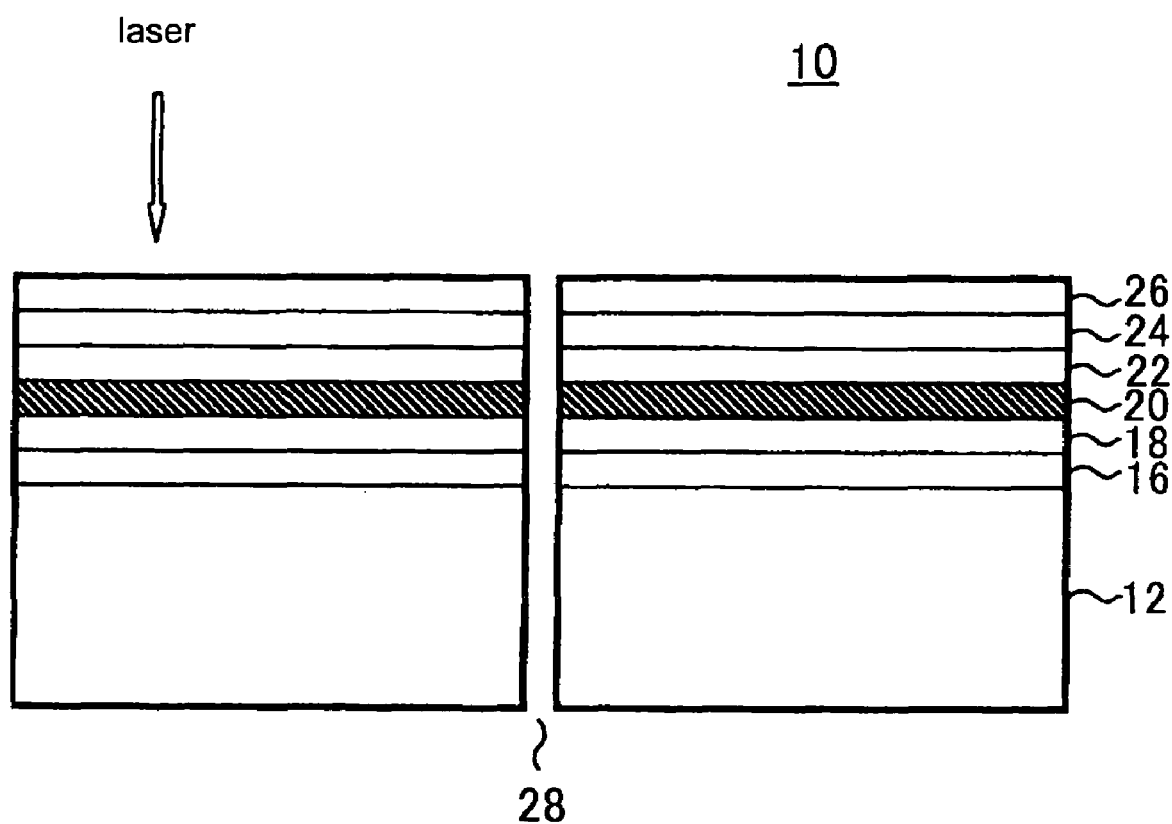
FIG. 2 is a schematic cross-sectional view illustrating the layer structure of an optical recording medium employed for the recording system.

As shown in an enlarged schematic view in FIG. 2, an optical recording medium 10 used with a recording system 1, shown in FIG. 1, according to this embodiment is provided with at least a reflective film 16, a second dielectric layer 18, a recording layer 20, a first dielectric layer 22, and a light-transmitting layer 26, which are formed in that order on top of ("under" in FIG. 2) a support substrate 12 made of polycarbonate, and with a heat sink layer 24 between the first dielectric layer 22 and the light-transmitting layer 26, as required.

In this embodiment, the support substrate 12 is formed of polycarbonate resin by injection molding in a thickness of about 1.1 mm. On top thereof, the reflective film 16, the second dielectric layer 18, the recording layer 20, and the first dielectric layer 22, as well as the heat sink layer 24 (as required) are formed in that order by sputtering, with the light-transmitting layer 26 being formed of acrylic-based resin by spin coating in a thickness of about 100 μm. There is provided a hole 28 at the center portion of the optical recording medium 10. The optical recording medium 10 having such a structure is radiated with a recording laser beam from the light-transmitting layer 26 side to thereby record data, while being radiated with a reproducing laser beam from the light-transmitting layer 26 side to thereby reproduce data.

Accordingly, the light-transmitting layer 26 is formed to be considerably thicker in thickness than a resin layer corresponding to the position of the light-transmitting layer 26 in the optical recording medium 10 or a protective layer (about 5 to 10 μm in thickness) on the reflective layer in conventional CDs or DVDs or the like.

Only by way of example, the support substrate 12 is formed of polycarbonate as mentioned above. Although the reflective film 16 can be formed of any type of metal materials without limitation as long as it satisfies the required reflectivity, it is formed of an alloy composed mainly of Ag in this embodiment. Although the first and second dielectric layers 22, 18 can also be formed of any type of materials, the second dielectric layer 13 is formed of $Al_2O_3$ and the first dielectric layer 15 is formed of ZnS—$SiO_2$ in this embodiment in this embodiment. The recording layer 20 is formed of AgInSbTeGe-based material having a phase change recording-layer composition. The light-transmitting layer 26 is formed of an UV curable resin.

The heat sink layer 24 is formed of a material having a thermal conductivity k, where k>1 $W \cdot m^{-1} \cdot K^{-1}$, e.g., alumina ($Al_2O_3$).

The heat sink layer 24 is a layer for efficiently radiating heat given to the recording layer 20, serving to provide an additional power margin to the optical recording medium 10. Accordingly, the thermal conductivity of the heat sink layer 24 is required to be higher at least than that of the first dielectric layer 22.

On the other hand, the support substrate 12 has a thickness of about 1.1 mm, the reflective film 16 has a thickness of 10 to 300 nm, the second dielectric layer 18 has a thickness of 2 to 50 nm, the recording layer 20 has a thickness of 5 to 30 nm, the first dielectric layer 22 has a thickness of 10 to 300 nm, and the light-transmitting layer 26 has a thickness of 10 to 300 μm, preferably, 50 to 150 μm. However, the present invention is not limited thereto.

If the thickness of the heat sink layer 24 is below 10 nm, the thickness is controlled with difficulty, while a slight variation in thickness would cause a significant variation in the power margin. On the other hand, at a thickness of 30 nm or more would make it possible to obtain a noticeable effect of increasing the power margin. In contrast, an excessively greater thickness of the heat sink layer 24 would require elongated time for deposition, thereby causing not only a decrease in throughput but also a danger of thermal damage to a substrate 11. In consideration of the foregoing, the heat sink layer 24 is set at 10 to 200 nm in thickness, preferably, to 30 to 100 nm.

The recording layer 20 (AgInSbTeGe) of the optical recording medium 10 is made of a phase change film having different values of reflectivity between in the crystalline state and in the amorphous state, which is utilized for recording data. More specifically, the recording layer 20 of a non-recorded area is in the crystalline state with 20% reflectivity, for example. To record any data onto such a non-recorded area, a predetermined portion in the recording layer 20 is heated to a temperature higher than the melting point in accordance with the data to be recorded and then quickly cooled down into an amorphous state. The portion in the amorphous state has, e.g., 7% reflectivity, thus allowing the predetermined data to be recorded. To overwrite data once recorded, the portion of the recording layer 14 on which the data to be overwritten is recorded is heated to a temperature equal to or higher than the crystallization point or the melting point in accordance with data to be recorded, and thus changed into the crystalline state or an amorphous state.

In this case, the relation between the power Pw (recording power) of a recording laser beam with which the recording layer 20 is radiated to melt, the power Pb (ground power) of a recording laser beam with which the recording layer 20 is radiated to cool down, and the power Pe (erasing power) of a recording laser beam with which the recording layer 20 is radiated to crystallize is expressed by Pw≧Pe>Pb.

The optical recording medium 10 according to this embodiment preferably stores "recording condition setting information," though the present invention is not limited thereto The recording condition setting information refers to various conditions necessary to record/reproduce data on/from the optical recording medium 10, e.g., information used for identifying the power of a recording laser beam or a recording strategy. The recording condition setting information includes not only those pieces specifically indicative of each condition necessary to record/reproduce data but also those pieces for identifying a recording/reproduction condition by specifying any of the various conditions pre-stored in an information recording apparatus.

On the other hand, the "recording strategy" refers to a method of radiation with a recording laser beam to form recording marks, i.e., the settings such as the number of recording laser beam pulses, the pulse width of each pulse, the pulse interval, and the power of recording laser beams (Pw, Pe, and Pb). The "recording strategy" is determined in accordance with the recording condition setting information stored in the optical recording medium 10.

To record data on the optical recording medium 10 according to this embodiment, it is necessary to set the ratio (Pe/Pw) of the erasing power Pe to the recording power Pw of a recording laser beam within an appropriate range. If the ratio (Pe/Pw) of the erasing power Pe to the recording power Pw is out of the appropriate range, recording marks cannot be formed in a proper shape, thus causing significant degradation in jitter. Suppose that the jitter is defined as jitter (1.0) when the ratio (Pe/Pw) of the erasing power Pe to the recording power Pw is 1.0. In this case, the optical recording medium 10 according to this embodiment satisfies the condition given by $$\text{Jitter } (1.0) < 13\% \tag{1}$$

Thus, the optical recording medium 10 according to this embodiment allows old data to be overwritten directly with new data, effectively preventing degradation in jitter even when the ratio of the erasing power to the recording power is increased to thoroughly erase the old data. Additionally, the optical recording medium 10 according to this embodiment preferably satisfies the condition given by $$\text{Jitter } (1.0) < 11\% \tag{2}$$

With such a condition satisfied, degradation in jitter is more effectively prevented in overwriting old data directly with new data even when the ratio of the erasing power to the recording power is increased to thoroughly erase the old data.

Furthermore, suppose that the jitter is defined as jitter (0.7) when the ratio (Pe/Pw) of the erasing power Pe to the recording power Pw is 0.7. In this case, the optical recording medium 10 according to this embodiment more preferably satisfies the condition given by $$\text{Jitter } (0.7) < 10\% \tag{3}$$

With such a condition satisfied, degradation in jitter is prevented much more effectively in overwriting old data directly with new data even when the ratio of the erasing power to the recording power is increased to thoroughly erase the old data. Additionally, the optical recording medium 10 according to this embodiment more preferably satisfies the condition given by $$\text{Jitter } (0.7) < 9\% \tag{4}$$

With such a condition satisfied, degradation in jitter is prevented very effectively in directly overwriting old data with new data even when the ratio of the erasing power to the recording power is increased to thoroughly erase the old data.

Now, a method for fabricating the optical recording medium 10 according to this embodiment will be described below.

Figure 3:
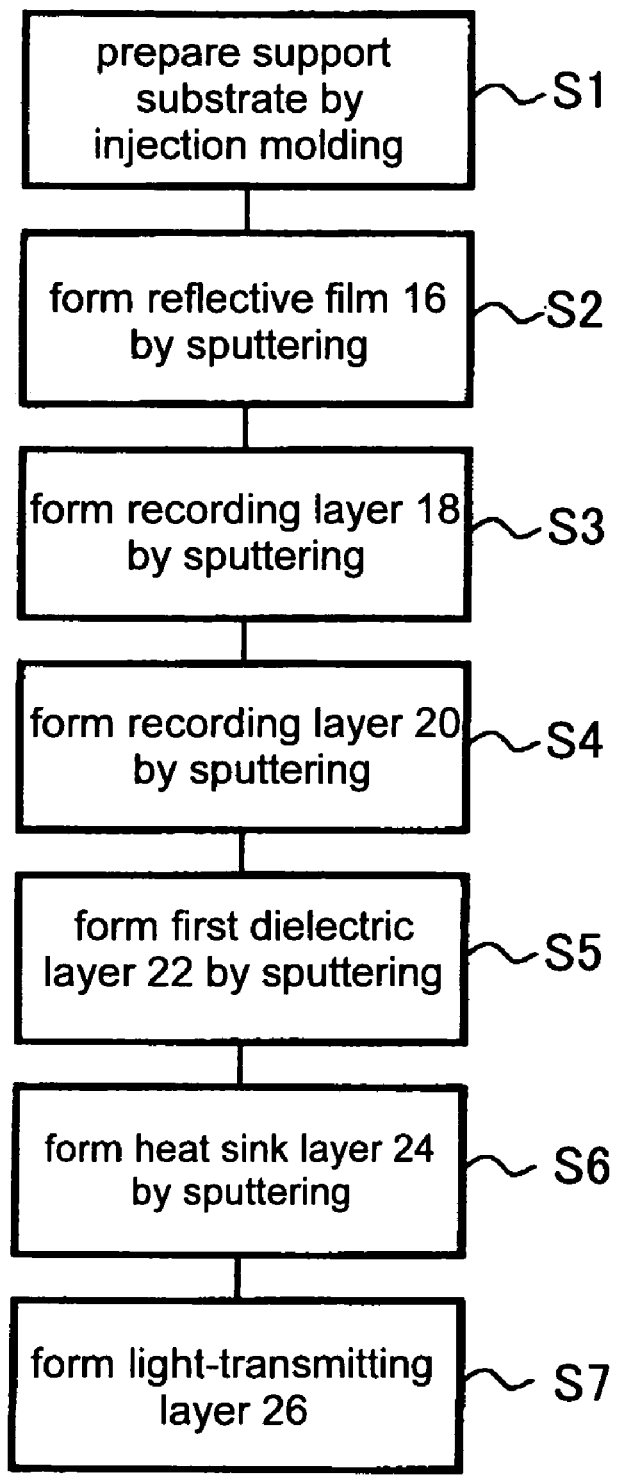
FIG. 3 is a flowchart showing a method of fabricating an optical recording medium 10.

FIG. 3 is a flowchart showing the method for fabricating the optical recording medium 10 according to this embodiment. As described above, the light-transmitting layer 26 of the optical recording medium 10 is as very thin as 10 to 300 µm in thickness, thus being deposited in the reverse order to that for the typical conventional DVD-RWs.

First, a stamper is used to injection mold a substrate 11 having a thickness of about 1.1 mm, with a pre-groove of groove width about 0.15 µm, track pitch about 0.32 µm, and groove depth about 20 nm (step S1).

Then, the support substrate 12 is transported into a first chamber (not shown) of a sputtering apparatus. The sputtering apparatus is provided in the first chamber with an alloy composed mainly of silver as a target. Then, the first chamber is pumped into a vacuum of about $1 \times 10^{-4}$ Pa. Subsequently, an argon gas is introduced into the first chamber to set the gas pressure at 0.1 to 1.0 Pa. Thereafter, a DC or RF voltage is applied to the target for sputtering. In this manner, on top of the support substrate 12, formed is a reflective film 16 of 10 to 300 nm in thickness (step S2).

Then, the support substrate 12 having the reflective film 16 formed thereon is transported from the first chamber to a second chamber (not shown). In the second chamber of the sputtering apparatus, provided is $Al_2O_3$ as a target. Then, the second chamber is pumped into a vacuum of about $1 \times 10^{-4}$ Pa. Subsequently, an argon gas is introduced into the second chamber to set the gas pressure at 0.1 to 1.0 Pa for sputtering. In this manner, on top of the reflective film 16, formed is a second dielectric layer 18 having a thickness of 2 to 50 nm (step S3).

Then, the support substrate 12 having the reflective film 16 and the second dielectric layer 18 formed thereon is transported from the second chamber to a third chamber (not shown). In the third chamber of the sputtering apparatus, provided is a target mixture of Ag, In, Sb, Te, and Ge. Then, the third chamber is pumped into a vacuum of about $1 \times 10^{-4}$ Pa. Subsequently, an argon gas is introduced into the third chamber to set the gas pressure at 0.1 to 1.0 Pa for sputtering. In this manner, on top of the second dielectric layer 18, formed is a recording layer 20 having a thickness of 5 to 30 nm (step S4).

Then, the support substrate 12 having the reflective film 16 to the recording layer 20 formed thereon is transported from the third chamber to a fourth chamber (not shown). In the fourth chamber of the sputtering apparatus, provided is a target mixture of ZnS and $SiO_2$. Then, the fourth chamber is pumped into a vacuum of about $1 \times 10^{-4}$ Pa. Subsequently, an argon gas is introduced into the fourth chamber to set the gas pressure at 0.1 to 1.0 Pa for sputtering. In this manner, on top of the recording layer 20, formed is a first dielectric layer 22 having a thickness of 10 to 300 nm (step S5).

Then, the support substrate 12 having the reflective film 16 to the first dielectric layer 22 formed thereon is transported from the fourth chamber to a fifth chamber (not shown). In the fifth chamber of the sputtering apparatus, provided is a target of $Al_2O_3$. Then, the fifth chamber is pumped into a vacuum of about $1 \times 10^{-4}$ Pa. Subsequently, an argon gas is introduced into the fifth chamber to set the gas pressure at 0.1 to 1.0 Pa for sputtering. In this manner, on top of the first dielectric layer 22, formed is a heat sink layer 24 having a thickness of 10 to 200 nm, preferably, 30 to 100 nm (step S6). The sputtering of the heat sink layer 24 may also be carried out in the second chamber.

In this manner, the reflective film 16, the second dielectric layer 18, the recording layer 20, the first dielectric layer 15, and the heat sink layer 24 are completely formed on the support substrate 12. Then, the support substrate 12 having each of these layers formed thereon is taken out of the fifth chamber of the sputtering apparatus and then coated on the surface of the heat sink layer 24 with an UV curable resin such as by spin coating, by roll coating, or by screen printing. Then, the resulting substrate 12 is radiated with an ultraviolet radiation to thereby form a light-transmitting layer 17 having a thickness of about 10 to 300 μm (step S7). In the foregoing, the optical recording medium 10 according to this embodiment is completed. To form the light-transmitting layer 26, a pre-molded resin sheet material such as of polycarbonate or polyolefin may also be adhered to the surface of the heat sink layer 24.

Now, an optical recording/reproducing apparatus 30 for recording data onto the optical recording medium 10 in the optical recording system 1 will be described with reference to FIG. 1.

FIG. 1 is a schematic view illustrating the main portion of a preferred information recording apparatus for recording data on the optical recording medium 10.

As shown in FIG. 1, the information recording/reproducing apparatus 30 illustrated includes a spindle motor 2 for rotating the optical recording medium 10, a head 3 for radiating the optical recording medium 10 with a recording laser beam, a controller 4 for controlling the operations of the spindle motor 2 and the head 3, a laser drive circuit 5 for supplying a laser drive signal to the head 3, and a lens drive circuit 6 for supplying a lens drive signal to the head 3.

Furthermore, as shown in FIG. 1, the controller 4 includes a focus servo follower circuit 7, a tracking servo follower circuit 8, and a laser control circuit 9. Activating the focus servo follower circuit 7 would allow the recording surface of the optical recording medium 10 being rotated to be focused, while activating the tracking servo follower circuit 8 would allow the spot of a laser beam to automatically follow an eccentric signal track of the optical recording medium 10. The focus servo follower circuit 7 and the tracking servo follower circuit 8 are each provided with an automatic gain control function for automatically adjusting focus gain and an automatic gain control function for automatically adjusting tracking gain, respectively. The laser control circuit 9 generates a laser drive signal to be supplied by the laser drive circuit 5, while generating an appropriate laser drive signal in accordance with recording condition setting information stored in-the optical recording medium 10, if any.

These focus servo follower circuit 7, the tracking servo follower circuit 8, and the laser control circuit 9 do not always need to be a circuit incorporated into the controller 4 but may also be a component separated from the controller 4. Furthermore, these circuits need not to be always in the form of a physical circuit but may also be in the form of software to be executed in the controller 4.

Although not limited to the following particular arrangement, the information recording apparatus suitable for recording data onto the optical recording medium 10 employs preferably a recording laser beam of wavelength 450 nm or less, preferably 380 to 450 nm, more preferably 405 nm, and an objective lens (not shown) or part of the head 3 for focusing a recording laser beam, having an NA (numerical aperture) of 0.7 or more. In recording data onto the optical recording medium 10 using such an information recording apparatus, a distance (working distance) to be set between the objective lens and the surface of the optical recording medium 10 is very small (e.g., about 80 to 150 μm), thereby making it possible to realize a beam spot of a significantly reduced diameter as compared with the conventional one. This makes it possible to realize an extremely high data transfer rate (e.g., 35 Mbps or greater) in recording data onto the optical recording medium 10 using such an information recording apparatus.

Additionally, as described above, in recording data onto the optical recording medium 10 according to this embodiment using such an information recording apparatus 30, a recording strategy determined in accordance with recording condition setting information stored on the optical recording medium 10, if any, is used to determine the ratio of the erasing power Pe to the recording power Pw of the recording laser beam.

More specifically, the recording layer 20 is radiated with the aforementioned laser beam from the light-transmitting layer 26 side via the objective lens at the recording power Pw or the erasing power Pe, thereby recording or erasing information on the recording layer 20. The optical recording medium 10 is also designed to provide a jitter value below 10% at the time of reproducing the information that has been recorded by being radiated with a laser beam under the condition of $0.7 \leq Pe/Pw \leq 1.0$.

The heat sink layer 24 has a thickness of 10 nm or more because a thickness of less than 10 nm would cause the power margin of the laser beam to be significantly varied due to a slight variation in thickness. Accordingly, the thickness is preferably determined to be 30 nm or more.

Furthermore, the aforementioned thickness is 200 nm or less because a thickness greater than 200 nm would require an excessive time for its deposition during manufacturing, simultaneously causing increased thermal damage to the support substrate 12. Accordingly, the thickness is determined to be 200 nm or less, more preferably 100 nm or less.

Figure 4:
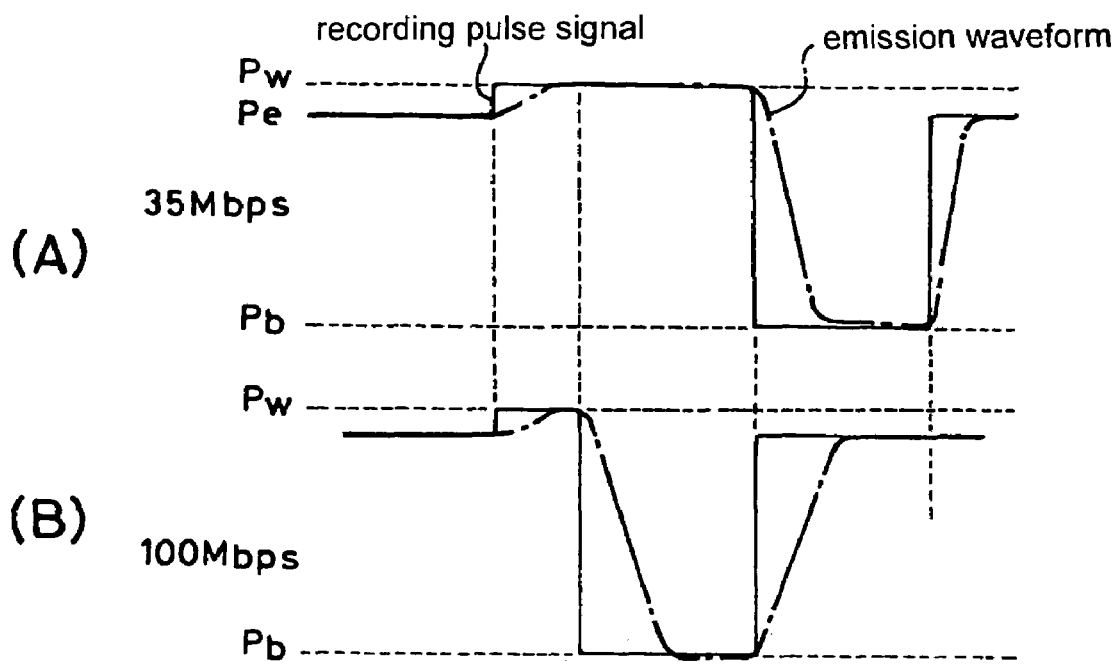
FIG. 4 is a diagram showing the relation between the pulse strategy and the emission waveform of a laser beam for recording operations on an optical recording medium in a recording system according to the embodiment.

As described above, the optical recording medium 10 according to this embodiment makes the playback jitter value below 10% even when the erasing power Pe of an erasing laser beam is within the range of $0.7 \leq Pe/Pw \leq 1.0$ relative to the recording power Pw. For example, as shown in FIG. 3, the emission waveform of a laser beam actually emitted from a laser 36 (see FIG. 1) has a very good trackability to the recording pulse signal for driving the laser 36. FIG. 4(A) shows a recording transfer rate of 35 Mbps, while FIG. 4(B) shows a rate of 100 Mbps.

Figure 5:
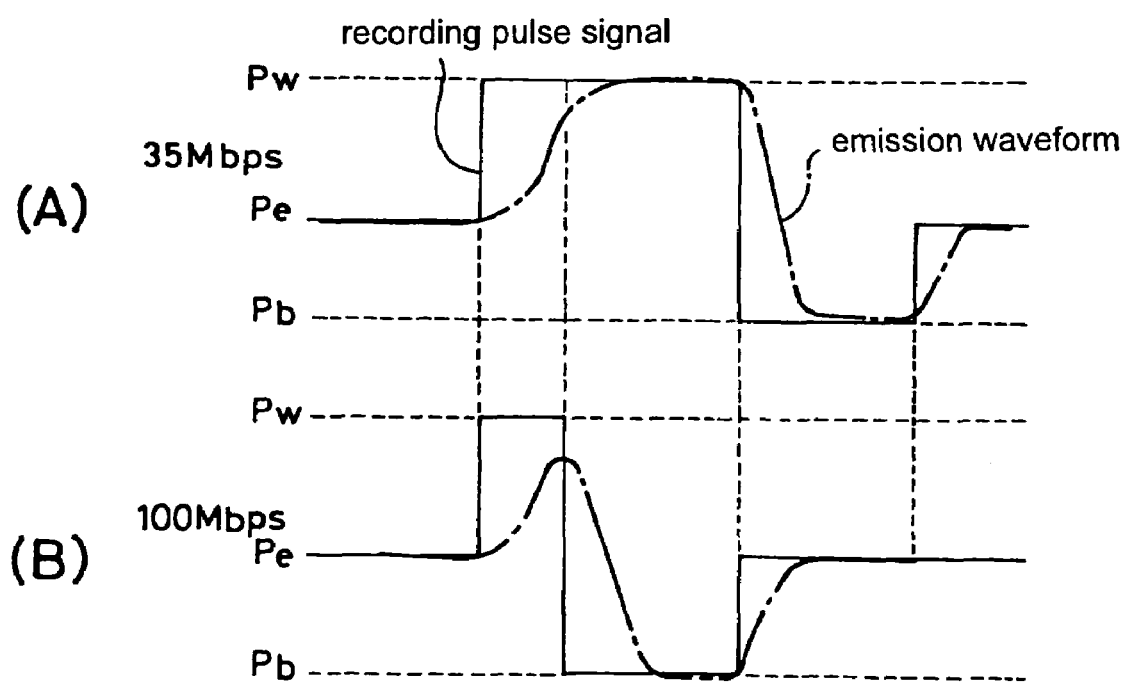
FIG. 5 is a diagram showing the relation between the pulse strategy and the emission waveform of a laser beam for an optical recording medium having no heat sink layer according to the present invention.

In contrast to this, suppose that Pe/Pw is about 0.5. In this case, as shown in FIGS. 5(A) and 5(B), the emission waveform has a lower trackability to the recording pulse signal. Particularly, in the case of a recording transfer rate of 100 Mbps as shown in FIG. 5(B), the recording pulse signal having a narrow pulse width will fall before the emission waveform completely rises.

That is, the heat sink layer 24 is provided to accelerate the radiation of heat from the recording layer 20 and prevent the heat from being accumulated therein. Thus, this will not allow the heat to cause self-erasing during recording operations even when the erasing power Pe of a laser beam for erasing operations is made higher than the conventional level relative to the recording power Pw. Accordingly, it is possible to prevent degradation in playback jitter value.

To record information onto the recording layer 20, the recording power Pw of a laser beam multiplied by the pulse width of a recording pulse equal to the amount of input heat has to be in a predetermined range.

The optical recording medium 10 according to this embodiment is provided with the heat sink layer 24 and thereby allows heat to readily escape from the recording layer 20, thus making it possible to set the pulse width in a wide range at a constant recording power Pw. In contrast to this, without the heat sink layer 24, the amount of target input heat can be reached in a short time, thus providing a lower degree of flexibility in the setting range of pulse width.

In the aforementioned embodiment, the heat sink layer 24 is made of alumina. The present invention is not limited thereto but may also employ a material having a thermal conductivity within the aforementioned range and formable in the shape of film for covering the recording layer 20 therewith, e.g., aluminum nitride or the like.

Additionally, in the aforementioned embodiment, the light-transmitting layer 26 is made of an acryl-based resin; however, any type of material can also be selected from the group of an energy beam curable resin that is hardened by an energy beam such as an ultraviolet ray or a thermally curable resin that is hardened by heat, thus making the acryl-based resin, the epoxy-based resin, the urethane-based resin or the like applicable. It is also possible to employ a pre-formed resin film such as of polycarbonate or polyolefin for adhesion or the like.

Furthermore, the support substrate 12 may also be made of polyolefin or the like other than the polycarbonate as employed in the embodiment.

The aforementioned information recording apparatus 30 can also employ a (1, 7) RLL modulation scheme, though the present invention is not limited thereto. However, the information recording apparatus for recording data onto the optical recording medium 10 does not always need to employ such a modulation scheme to record data but may also employ other modulation schemes for recording data.

Now, an exemplary recording strategy will be described below which employs the (1, 7) RLL modulation scheme.

Figure 6:
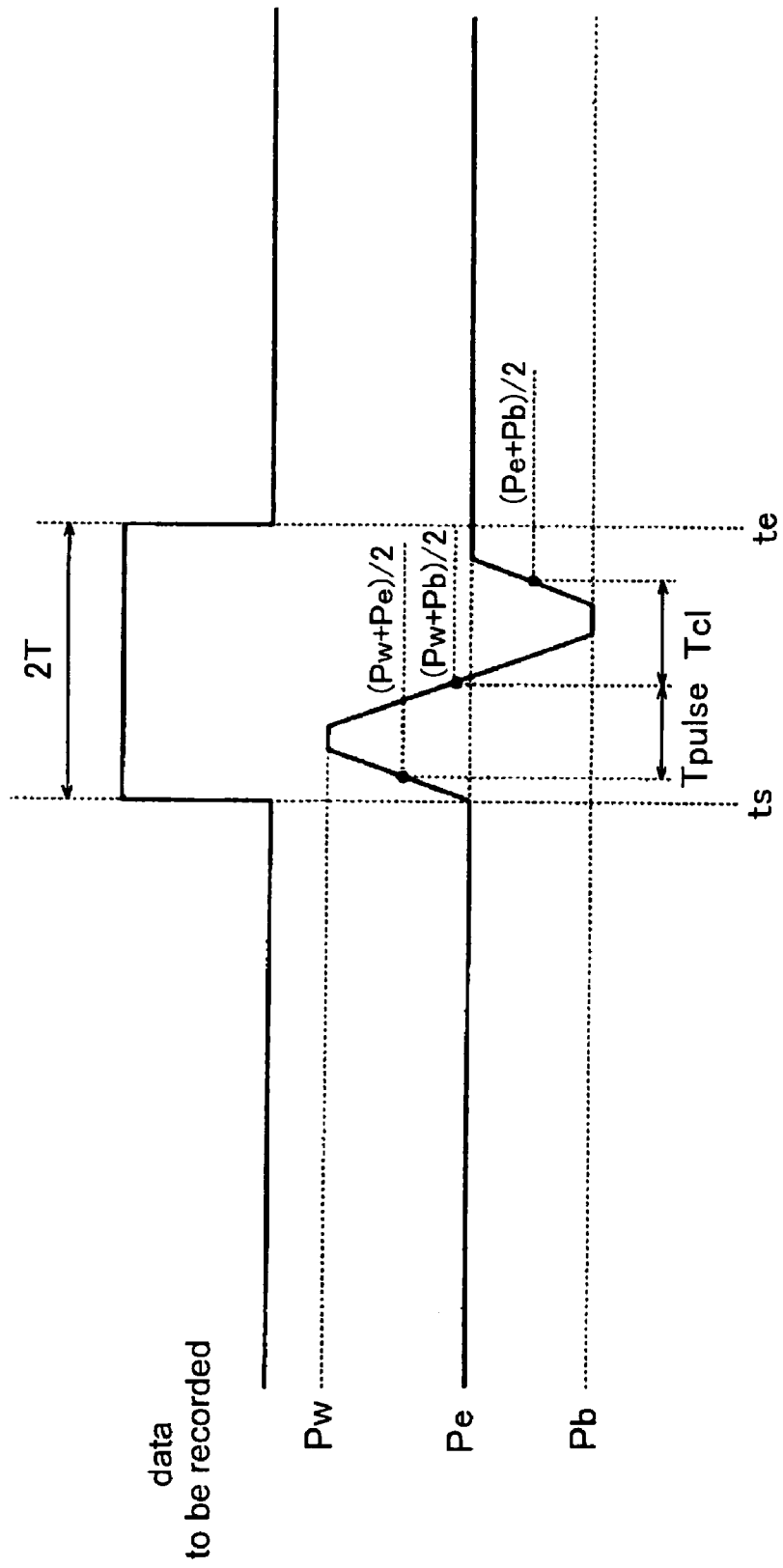
FIG. 6 is an exemplary view illustrating the recording strategy for forming a recording mark having a length corresponding to 2 T.

FIG. 6 is a view illustrating an exemplary recording strategy for forming a recording mark of a length corresponding to 2 T.

As shown in FIG. 6, to form a recording mark of a length corresponding to 2 T, the number of recording laser beam pulses is set at "1." In the foregoing, the number of recording laser beam pulses is defined by the number of times of raising the power of the recording laser beam up to Pw. In more detail, suppose that the timing at which the recording laser beam is positioned at the start point of a recording mark is time ts, and the timing at which the recording laser beam is positioned at the end point of the recording mark is time te. In this case, the power of the recording laser beam is raised once up to Pw and then to power Pb during the period from time ts to time te. The power of the recording laser beam is set at Pe before time ts, allowing the recording laser beam to start rising at time ts. On the other hand, the power of the recording laser beam at time te is set at Pe or Pb.

During the duration of Tpulse, the recording layer 20 of the optical recording medium 10 is subjected to a high energy to have a temperature higher than the melting point, whereas during the duration of Tcl, the recording layer 20 of the optical recording medium 10 is quickly cooled down. This allows the recording mark of a length corresponding to 2 T to be formed in the recording layer 20 of the optical recording medium 10.

To form a recording mark of another length, as in the case of forming the recording mark of the length corresponding to 2 T, the power of the recording laser beam is set at Pw, Pe, or Pb, thus forming recording marks having a desired length each by a predetermined number of pulses.

The optical recording medium 10 according to this embodiment provides a wide power margin as described above. It is therefore possible to reduce jitter in directly overwriting old data with new data even when the ratio of the erasing power to the recording power is increased to thoroughly erase the old data. Accordingly, even with recording operations performed at a high setting of data transfer rate (e.g., 35 Mbps or more), the old data can be thoroughly erased.

Now, examples of the present invention will be explained in detail below.

EXAMPLE 1

An optical recording medium was prepared in accordance with the following procedures.

A disc-shaped support substrate was employed which was made of a polycarbonate resin like in the aforementioned embodiment and which had a surface having grooves formed thereon (the depth of the grooves was $\lambda/18$ in terms of an optical path length at a wavelength $\lambda=405$ nm with a record track pitch of 0.32 µm). On top of this surface, a reflective film composed mainly of silver was formed by sputtering in a thickness of 100 nm.

Then, on the surface of the reflective film, formed was a second dielectric layer of $Al_2O_3$ by sputtering in a thickness of 20 nm.

Additionally, a recording layer was formed by sputtering in a thickness of 12 nm on the second dielectric layer using an alloy target of a phase change material. This recording layer was chosen to have a composition of AgInSbTeGe.

Furthermore, on the surface of the recording layer, a dielectric layer was formed by sputtering in a thickness of 30 nm using a ZnS(80 mol %)-$SiO_2$(20 mol %) target.

On the surface of this dielectric layer, as with the aforementioned second dielectric layer, a heat sink layer of $Al_2O_3$ was formed by sputtering in a thickness of 60 nm.

Then, the surface of the heat sink layer was coated by spin coating with an UV curable resin, and then radiated with an ultraviolet radiation to thereby obtain a light-transmitting layer of 10 µm in thickness.

COMPARATIVE EXAMPLE 1

Furthermore, an optical recording medium was prepared as Comparative example 1 which had the heat sink layer removed from the aforementioned example 1.

As with the aforementioned embodiment, recording operations were performed with these examples under the conditions of a wavelength $\lambda=405$ nm and a numerical aperture of the objective lens NA=0.85, at the recording power Pw of a laser beam fixed to 6.0 mW, with the erasing power Pe of a laser beam being varied so that the Pe/Pw was 0.25 to 1.00. Thereafter, the playback jitter value was measured as shown in FIG. 7.

Figure 7:
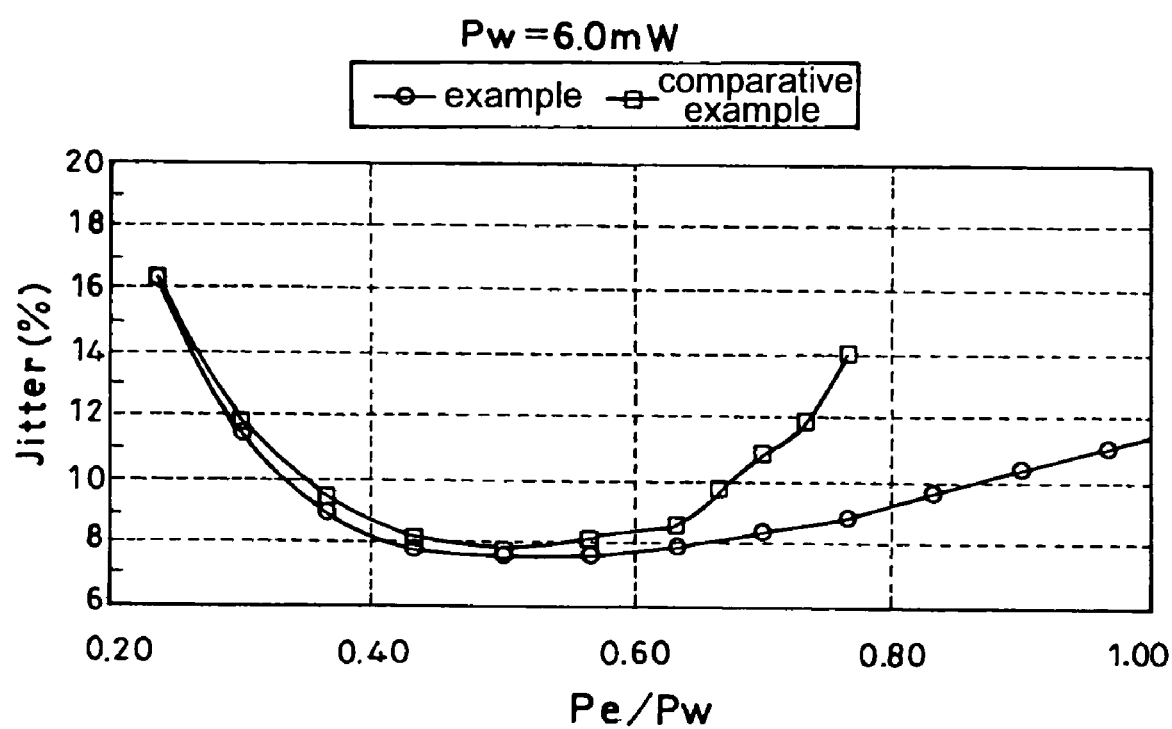
FIG. 7 is a diagram showing the relation between the playback jitter value and the ratio Pe/Pw of the erasing power Pe to the recording power Pw of a laser beam according to Example 1 of the present invention and Comparative example 1.

As can be seen from FIG. 7, the upper limit value of the Pe/Pw providing a playback jitter value of 10% or less is 0.67 in the comparative example, whereas being 0.87 in the case of the example of the present invention. Furthermore, the upper limit value of the Pe/Pw providing a jitter value of 13% or less is about 0.75 in the comparative example, whereas being above 1.0 in the example of the present invention.

This can be listed as shown in Table 1 below.

TABLE 1

| Pe/Pw | Playback jitter value (%) | |
|---|---|---|
| | Example | Comparative example |
| 0.5 | 7.5 | 8.0 |
| 0.6 | 7.5 | 8.3 |
| 0.7 | 8.3 | 11.0 |
| 0.8 | 8.5 | >14 |
| 0.9 | 9.2 | — |
| 1.0 | 11.1 | — |

EXAMPLE 2

In Example 2, with the heat sink layer changed to be 30 nm in thickness, recording operations were performed on the optical recording medium configured in the same manner as in Example 1 at each recording power Pw of a laser beam selected from 3.8 mW, 4.2 mW, and 6.0 mW with the erasing power Pe being varied relative to these recording powers Pw such that Pe/Pw was in the range of 0.3 to 1.1. Then, the playback jitter values were measured as shown in FIG. 8.

Figure 8:
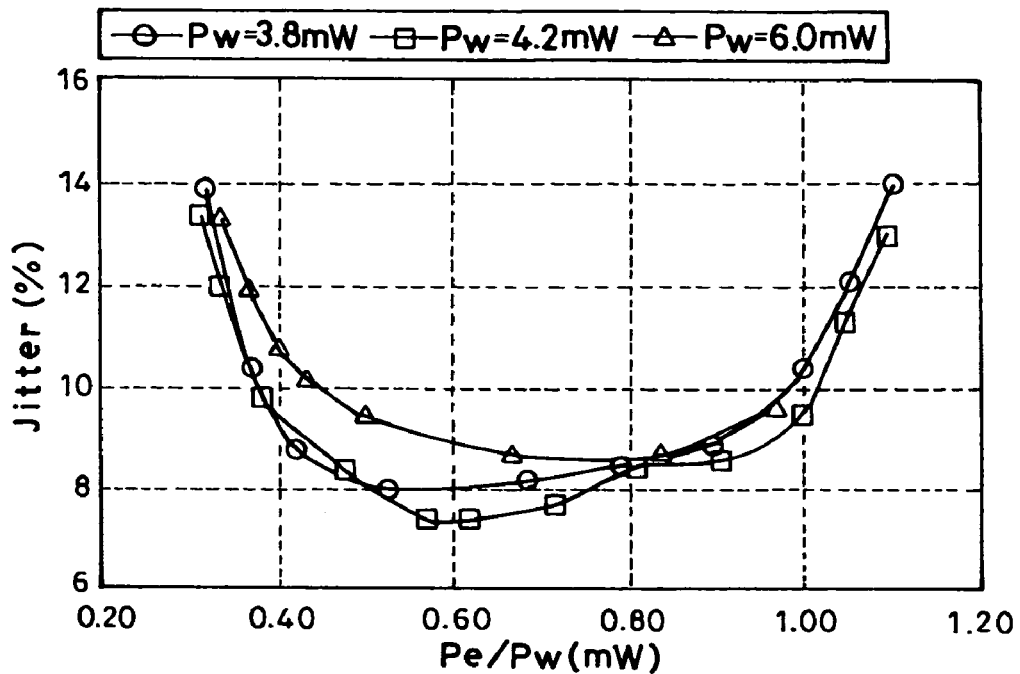
FIG. 8 is a diagram showing the relation between the playback jitter value and the Pe/Pw with the recording power of a laser beam varied according to Example 2 of the present invention.

From FIG. 8, it can be seen that even when the recording power of a laser beam is varied, the playback jitter value can be made 10% or less if the Pe/Pw is within the range of the embodiment.

EXAMPLE 3

Example 3 employs the same optical recording medium as that of Example 2. The optical recording medium of Example 3 was provided with the first dielectric layer of 45 nm in thickness without the heat sink layer to prepare Comparative example 2. Recording operations were performed on the comparative example 2 and Example 3 with the Pe/Pw being varied in the range of 0.3 to 1.0. Then, the playback jitter values were-measured as shown in FIG. 9.

Figure 9:
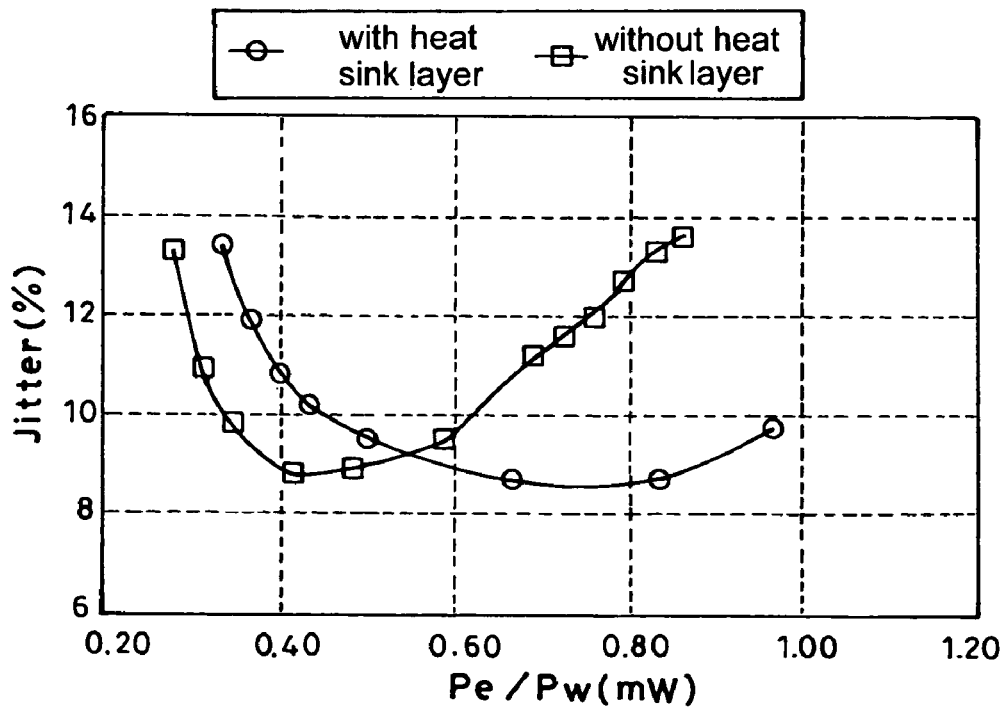
FIG. 9 is a diagram showing the relation between the playback jitter value and the ratio Pe/Pw of the erasing power Pe to the recording power Pw of a laser beam according to Example 3 of the present invention and Comparative example 2.

As seen from FIG. 9, the comparative example having no heat sink layer provides a jitter value of above 10% at the point of Pe/Pw exceeding 0.60, while providing a jitter value of above 13% at 0.80.

In contrast to this, the optical recording medium of Example 3 never exceeds a playback jitter value of 10% even at a Pe/Pw of 1.0.

EXAMPLE 4

The aforementioned method was employed to fabricate an optical recording medium 10-1 having the structure shown in FIG. 2, with the support substrate 12 having a thickness of 1.1 mm, the reflective film 16 having a thickness of 100 nm, the second dielectric layer 18 having a thickness of 20 nm, the recording layer 20 having a thickness of 12 nm, the first dielectric layer 22 having a thickness of 30 nm, the heat sink layer 24 having a thickness of 30 nm, and the light-transmitting layer 26 having a thickness of 100 µm.

With the optical recording medium 10-1, under the conditions shown in Table 2, the recording power Pw was set at 3.8 mW and a signal mixture of recording marks having lengths corresponding to 2 T to 8 T was formed using various erasing powers Pe. Then, the recording power Pw was set at 4.2 mW and a signal mixture of recording marks having lengths corresponding to 2 T to 8 T was formed using various erasing powers Pe. Furthermore, the recording power Pw was set at 6.0 mW and a signal mixture of recording marks having lengths corresponding to 2 T to 8 T was formed using various erasing powers Pe. The ground power Pb was set at 0.1 mW in all the cases. The (1, 7) RLL modulation scheme was employed for recording operations to record data only on one track.

TABLE 2

| Clock frequency | 66 MHz |
|---|---|
| Clock cycle (1T) | 15.15 nsec |
| Linear speed | 5.3 m/sec |
| Modulation scheme | (1,7) RLL |
| Format efficiency | 80% |
| Data transfer rate (efficiency considered) | 35 Mbps |
| Channel bit length | 0.12 µm/bit |
| Numerical aperture (NA) | 0.85 |
| Laser wavelength | 405 nm |

Then, the clock jitter of the signal mixture created on the optical recording medium 10-1 was measured. In the measurements, a time interval analyzer was used to determine the "fluctuation σ" of the playback signal to calculate σ/Tw (where Tw is one clock cycle).

Figure 10:
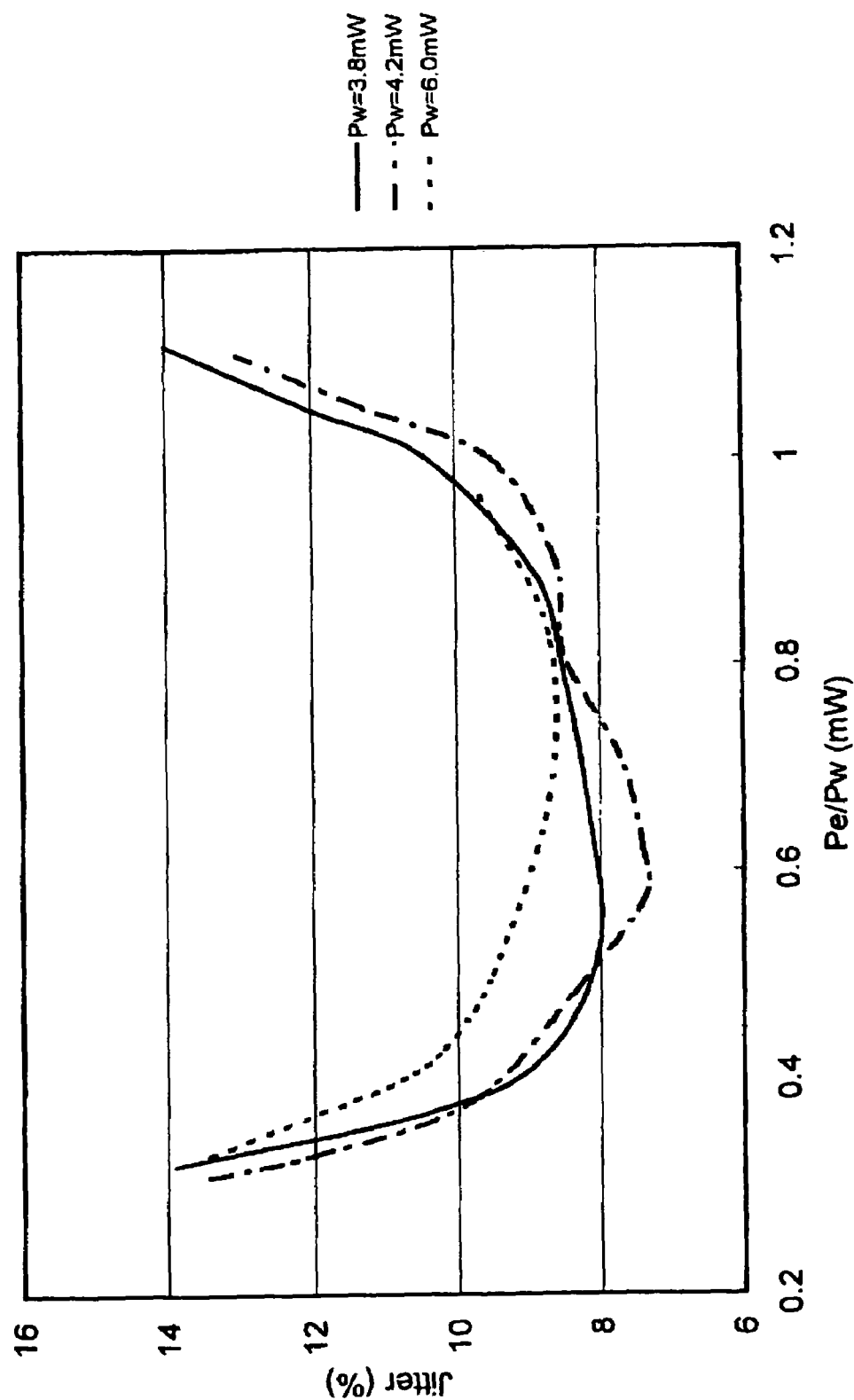
FIG. 10 is a diagram showing the relation between the playback jitter value and the Pe/Pw with the recording power of a laser beam varied according to Example 4 of the present invention.

The results of the measurements are shown in FIG. 10.

As shown in FIG. 10, at any setting of the recording power Pw to 3.8 mW, 4.2 mW, or 6.0 mW, the optical recording medium 10-1 provides the jitter (1.0) as shown below when the ratio (Pe/Pw) of the erasing power Pe to the recording power Pw is 1.0. That is, Jitter (1.0)<11%.

Furthermore, at any setting of the recording power Pw to 3.8 mW, 4.2 mW, or 6.0 mW, the optical recording medium 10-1 provides the jitter (0.7) as shown below when the ratio (Pe/Pw) of the erasing power Pe to the recording power Pw is 0.7. That is, Jitter (0.7)<9%.

As described above, it was confirmed that irrespective of the setting of the recording power Pw, the optical recording medium 10-1 provides reduced jitter and a very wide power margin even at a high setting of the ratio (Pe/Pw) of the erasing power Pe to the recording power Pw.

EXAMPLE 5

The aforementioned method was employed to fabricate an optical recording medium 10-2 having the structure shown in FIG. 2, with the support substrate 12 of 1.1 mm in thickness, the reflective film 16 of 100 nm in thickness, the second dielectric layer 18 of 20 nm in thickness, the recording layer 20 of 12 nm in thickness, the first dielectric layer 22 of 45 nm in thickness, and the heat sink layer 24 of 0 nm in thickness. The optical recording medium 10-2 is different from the aforementioned optical recording medium 10-1 in that the first dielectric layer 22 was changed to have a thickness of 45 nm and the heat sink layer 24 was changed to be 0 nm (no heat sink layer was provided).

With the optical recording medium 10-2, under the conditions shown in Table 2, the recording power Pw was set at 5.8 mW and a signal mixture of recording marks having lengths corresponding to 2 T to 8 T was formed using various erasing powers Pe. The (1, 7) RLL modulation scheme was employed for recording operations to record data only on one track.

Then, the clock jitter of the signal mixture created on the optical recording medium 10-2 was measured.

Figure 11:
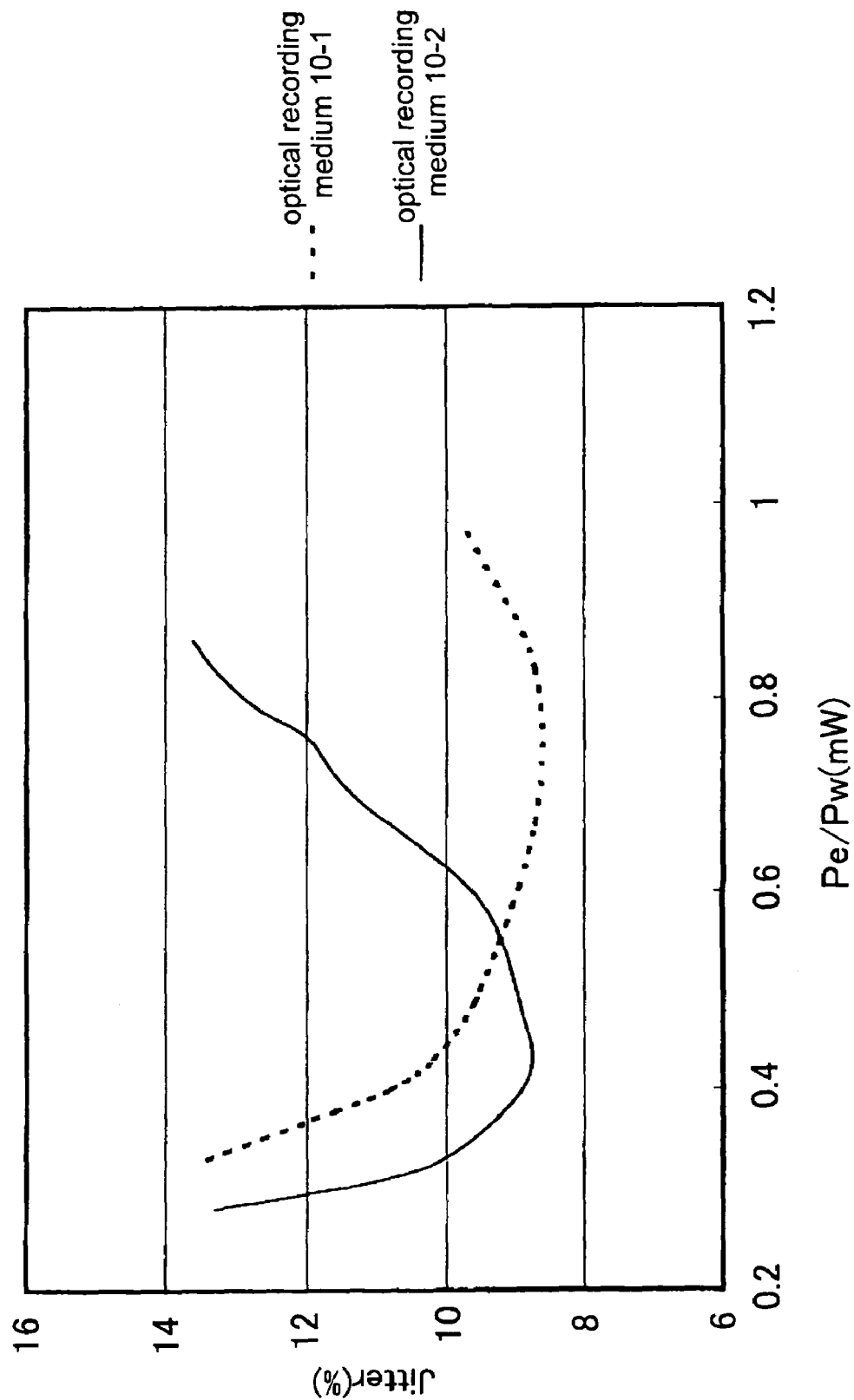
FIG. 11 is a diagram illustrating the relation between the playback jitter value and the ratio Pe/Pw of the erasing power Pe to the recording power Pw of a laser beam according to Example 5 of the present invention.

The results of the measurements are shown in FIG. 11. FIG. 11 also shows the results of measurements made when the recording power Pw was set at 6.0 mW with the optical recording medium 10-1.

As shown in FIG. 11, it is seen that the optical recording medium 10-2 satisfies Jitter (1.0)<13%, and Jitter (0.7)<10%.

It was confirmed with this example that in the absence of the heat sink layer 24, a higher setting of the ratio (Pe/Pw) of the erasing power Pe to the recording power Pw would cause faster degradation in jitter and a narrower power margin.

As described above, defining Jitter (1.0) as the jitter at a ratio (Pe/Pw) of the erasing power Pe to the recording power Pw being 1.0, the optical recording medium 10 according to this embodiment satisfies the condition given by Jitter (1.0)<13%        (1).

It is therefore possible to reduce jitter in directly overwriting old data with new data even when the ratio of the erasing power to the recording power is increased to thoroughly erase the old data.

The present invention is not limited to the aforementioned embodiment, and various modifications may also be made thereto within the scope of the invention defined in the claims, the modifications also being contained within the scope of the present invention.

For example, in the aforementioned embodiment, the structure shown in FIG. 2 was cited as a specific structure of the optical recording medium 10; however, the structure of the optical recording medium according to the present invention is not limited thereto.

INDUSTRIAL APPLICABILITY

The present invention is configured as described above, and thus can provide an advantageous effect of efficiently dissipating heat produced by a laser beam during recording operations to thereby increase the erasing power relative to the recording power of the laser beam.

Accordingly, a very wide power margin provided makes it possible to record data with stability.

The invention claimed is:

1. A recording system for an optical recording medium, the system including an optical recording medium provided with at least a light-transmitting layer covered with a recording layer formed on a support substrate, and a radiation optical system for recording, reproducing, and erasing information on the recording layer by radiating the optical recording medium from the light-transmitting layer side with a laser beam at a recording power Pw and an erasing power Pe, wherein the radiation optical system is designed to radiate the recording layer with a laser beam of wavelength 450 nm or less through a lens system having an objective lens of numerical aperture 0.7 or more, the optical recording medium is designed to be able to record or erase information on the recording layer when the relation between the recording power Pw of the laser beam and the erasing power Pe satisfies $0.75 \leq Pe/Pw \leq 0.87$, and the recording layer is provided, on its light-transmitting layer side, with a heat sink layer.

2. The recording system for an optical recording medium according to claim 1, wherein the radiation optical system is designed such that the laser beam has a wavelength of 380 nm or more.

3. The recording system for an optical recording medium according to claim 1, wherein the radiation optical system is designed such that the laser beam has a wavelength of 405 nm, and the lens system is designed to have an objective lens of numerical aperture 0.85.

4. The recording system for an optical recording medium according to claim 1, wherein the heat sink layer has a thickness of 10 nm or more and 200 nm or less, preferably, has a thickness of 30 nm or more and 100 nm or less.

5. The recording system for an optical recording medium according to claim 2, wherein the heat sink layer has a thickness of 10 nm or more and 200 nm or less, preferably, has a thickness of 30 nm or more and 100 nm or less.

6. The recording system for an optical recording medium according to claim 1, wherein the radiation optical system is designed to radiate the recording layer to record information thereon with a laser beam of wavelength 450 nm or less through a lens system having an objective lens of numerical aperture 0.7 or more, and the optical recording medium is designed to provide a playback jitter value of 10% or less for the information recorded.

7. The recording system for an optical recording medium according to claim 6, wherein the radiation optical system is designed such that the laser beam has a wavelength of 405 nm, and the lens system is designed to have an objective lens of numerical aperture 0.85.

8. The recording system for an optical recording medium according to claim 6, wherein the heat sink layer has a thickness of 10 nm or more and 200 nm or less, preferably, has a thickness of 30 nm or more and 100 nm or less.

9. The recording system for an optical recording medium according to claim 6, wherein the radiation optical system is designed such that the laser beam has a wavelength of 380 nm or more.

10. The recording system for an optical recording medium according to claim 9, wherein the heat sink layer has a thickness of 10 nm or more and 200 nm or less, preferably, has a thickness of 30 nm or more and 100 nm or less.

* * * * *